United States Patent [19]

Kaminaka et al.

[11] Patent Number: 4,504,540
[45] Date of Patent: Mar. 12, 1985

[54] THIN FILM ELEMENT

[75] Inventors: Nobuyuki Kaminaka; Kenji Kanai, both of Osaka; Noboru Nomura, Kyoto; Yuji Omata, Osaka, all of Japan

[73] Assignee: Matsushita Electric Industrial Co., Ltd., Osaka, Japan

[21] Appl. No.: 582,866

[22] Filed: Feb. 27, 1984

Related U.S. Application Data

[63] Continuation of Ser. No. 405,058, Aug. 4, 1982, abandoned.

[30] Foreign Application Priority Data

Aug. 7, 1981 [JP] Japan .................. 56-123120

[51] Int. Cl.³ .............. B32B 3/00; B32B 9/04
[52] U.S. Cl. .................. 428/195; 428/201; 428/209; 428/446; 428/450; 428/469; 428/692; 428/698; 428/702; 428/900; 428/901

[58] Field of Search ............... 428/900, 901, 450, 195, 428/446, 201, 209, 469, 692, 698, 702

[56] References Cited

U.S. PATENT DOCUMENTS

| 3,728,176 | 4/1973 | Osborne et al. | 428/901 X |
| 4,187,339 | 2/1980 | Cayrol | 428/901 X |
| 4,189,524 | 2/1980 | Lazzari | 428/901 X |
| 4,336,295 | 6/1982 | Smith | 428/901 X |

Primary Examiner—Thomas J. Herbert
Attorney, Agent, or Firm—Burgess, Ryan & Wayne

[57] ABSTRACT

The invention provides a thin film element which includes a thin film of an organic material, which has a multilayered structure of thin films, and which has a protective film of multilayered structure having films of at least two nonmagnetic materials, or of a thin film of a mixture of at least two nonmagnetic insulating materials. The protective film has a low internal stress, and the step coverage and adhesion strength thereof at edges of the high step portion is excellent.

5 Claims, 4 Drawing Figures

THIN FILM ELEMENT

This application is a continuation, of application Ser. No. 405,058, filed Aug. 4, 1982 and now abandoned.

BACKGROUND OF THE INVENTION

The present invention relates to a multilayered thin film element and, more particularly, to a thin film element with an uppermost protective film of a novel structure.

In a thin film element in which thin films are deposited on a substrate, a protective film is formed as the uppermost layer to protect the underlying thin films. In some thin film elements, the substrate is cut into chips each of which is abraded. Therefore, the protective film directly affects the reliability of the thin film element.

The protective film is conventionally often made of a relatively thick single insulator with relatively high hardness. Meanwhile, a heat-resistant photoresist organic material has been recently used as the insulating interlayer. The photoresist film has been used because the photolithography techniques such as exposure and development can be performed to etch a relatively thick layer without the conventional etching process and because step coverage of a high step is excellent due to its viscosity. However, still presented are the problems such as the internal stress and adhesion strength of the protective film and the step coverage at the edges of high steps. If these problems occur, a protective film 9 peels off from the edges of the high step portion immediately after it is formed. Even if the protective film 9 does not peel off immediately after it is formed, the protective film 9 together with a thin film formed thereunder may peel off or float when the thin film element is cut into chips or processed. Further, when an organic material is used for the insulating interlayer, the temperature range is limited so that an excellent protective film can hardly be formed.

SUMMARY OF THE INVENTION

It is, therefore, an object of the present invention to provide a thin film element which includes organic thin films of a multilayered structure and a protective film formed as an uppermost layer with a slight internal stress so as to properly cover the multilayered structure with good step coverage and adhesion strength at edges of a high step portion.

According to the present invention, the protective film is a multilayered thin film having films of at least two different nonmagnetic insulating materials or a thin film of a mixture of at least two such materials. The protective film is formed in a temperature range which these organic materials can withstand. As a result, the above object of the present invention is achieved to provide a high reliable thin film element.

DETAILED DESCRIPTION OF THE PRIOR ARTS

Figure 1:
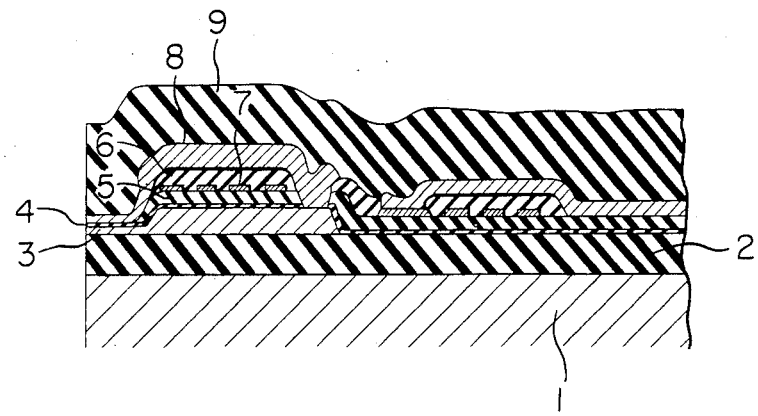
FIG. 1 is a sectional view of a conventional thin film element.
Figure 2:
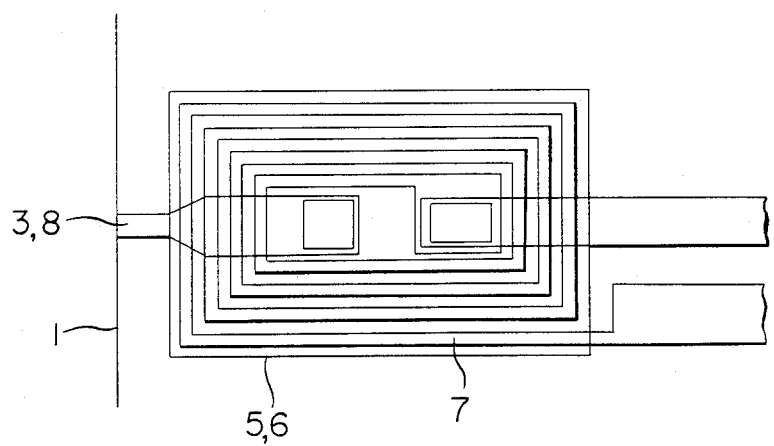
FIG. 2 is a plan view of the thin film element shown in FIG. 1.

FIGS. 1 and 2 are a sectional view and a plan view of a conventional thin film magnetic head. A nonmagnetic insulating layer 2, a lower magnetic layer 3, a nonmagnetic insulating layer 4 as a gap material, insulating interlayers 5 and 6, a conductive layer 7, and an upper magnetic layer 8 are sequentially formed on a substrate 1. A protective film 9 which comprises a nonmagnetic insulator with a high hardness such as $Al_2O_3$, $SiO_2$ and SiC is formed on the upper magnetic layer 8 to protect the above-mentioned thin layers. Especially, in the thin film magnetic head, the substrate 1 is cut into chips in a predetermined shape and the chips are abraded. Therefore, the protective film 9 is formed to a relatively large thickness of 10 to 30 $\mu$m. The insulating interlayers 5 and 6 comprise heat-resistant organic photoresist films.

In the above structure, the protective film 9 comprises one of the nonmagnetic insulating materials such as $Al_2O_3$, $SiO_2$ and SiC. The formation step of the protective film 9 is limited by the heat resistance of the organic insulating interlayer. As a result, the protective film 9 has a relatively large internal stress. Further, step coverage and adhesion strength of the protective film 9 at the edges of the high step portion are degraded.

DETAILED DESCRIPTION OF THE PREFERRED EMBODIMENTS

Figure 3:
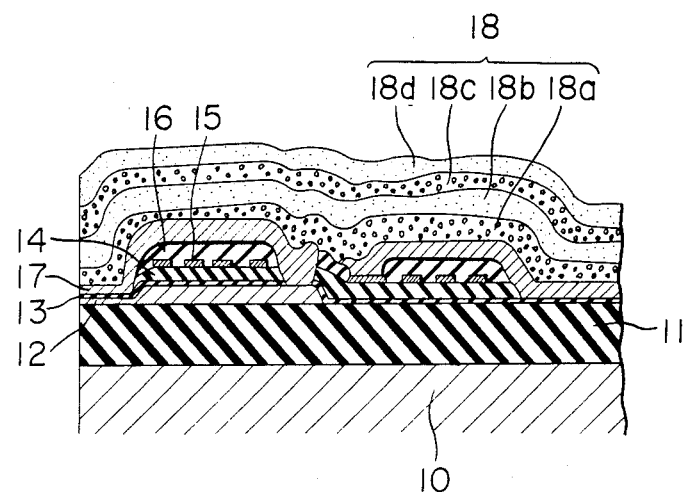
FIG. 3 is a sectional view of a thin film element according to one embodiment of the present invention.

FIG. 3 is a sectional view of a thin film magnetic head according to one embodiment of the present invention. After a nonmagnetic insulating layer 11 made of a material such as $SiO_2$ is formed on a nonmagnetic substrate 10 of $Al_2O_3$-TiC, a lower magnetic layer 12 is electrodeposited on the nonmagnetic insulating layer 11. Then, a nonmagnetic insulating layer 13 of $SiO_2$ as a gap material is formed on the lower magnetic layer 12. After a insulating interlayer 14 is formed on the nonmagnetic insulating layer 13, copper is electrodeposited or aluminum is deposited to form a conductive layer 15 as a coil on the insulating interlayer 14. An insulating interlayer 16 is then formed on the conductive layer 15. The insulating interlayers 14 and 16 comprise an organic photoresist material. An upper magnetic layer 17 is formed on the insulating interlayer 16. Thereafter, $SiO_2$ layers 18a and 18c and $Al_2O_3$ layers 18b and 18d are alternately deposited to form a protective film 18. In this embodiment, the protective film 18 comprises a four-layered structure in which each layer has a thickness of 1 $\mu$m to 5 $\mu$m, so that the protective film 18 as a whole has a predetermined total thickness. The protective film 18 as the nonmagnetic insulating material is formed by sputtering using a double-head sputtering device to effectively form layers of different material alternately. Further, an auxiliary chamber is used to alternately move different deposition sources, thus preventing time-consuming operation.

The above process provides an excellent protective film as compared with a protective film obtained by sputtering a single nonmagnetic insulator. In the latter protective film, the internal stress is relatively large. Further, depending on the types of materials, the internal stress may vary from the tensile stress to the compression stress. However, when layers of different nonmagnetic materials are alternately formed to obtain a multilayered structure, it is found that the internal stress is decreased as a whole. In order to further decrease the internal stress, the thickness of each layer of the multilayered structure can be adjusted. In the above embodiment, the multilayered structure comprises layers of $SiO_2$ and $Al_2O_3$. However, a combination of layers of $SiO_2$ and SiC or of SiC and $Al_2O_3$ can provide the similar results. Further, three kinds of materials may also be used to form a multilayered structure so as to obtain the same results. Although nonmagnetic insulators must be properly selected, a multilayered structure which comprises alternately formed films of at least two different types of materials is understood to provide effects for decreasing the internal stress.

Figure 4:
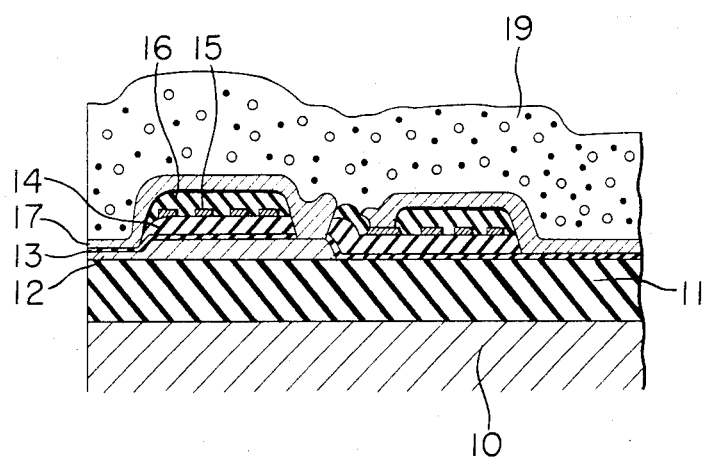
FIG. 4 is a sectional view of a thin film element according to another embodiment of the present invention.

Despite the above description, a mixed target material may be used to perform sputtering in the same sputtering chamber. As shown in FIG. 4, a protective film 19 according to another embodiment of the present invention can then be obtained to considerably decrease the internal stress of the protective film 19.

The thin film magnetic head in FIG. 4 is substantially the same as that in FIG. 3 except that the protective film 19 is used in place of the protective film 18. The dots and circles in FIG. 4 schematically represent the two major constituents of the protective film 19, e.g. two constituents selected from the group consisting of $Al_2O_3$, $SiO_2$ and SiC.

The step coverage at the edges of the high step portion and adhesion strength of the protective film can be improved by controlling the sputtering conditions (gas pressure, input power and potential of the substrate) while heating the substrate to a relatively low temperature, that is, within the temperature range which the insulating interlayers 14 and 16 as the photoresist films can withstand.

In the above embodiments, a case has been described in which the thin film element is used as the thin film magnetic head. However, the present invention may also be applied to any other thin film element which has a multilayered structure and uses an organic material to be processed at a relatively low temperature for the insulating interlayer.

As described above, according to the present invention, an excellent protective film with a slight internal stress properly covers the edges of the high step portion and is firmly adhered to the layers formed thereunder. Therefore, a highly reliable thin film element with the above protective film is obtained.

What is claimed is:

1. A thin film element, comprising:
   a substrate;
   a multilayer thin film structure formed on said substrate for performing a desired function, said structure having a layer comprising an organic material and a layer comprising a magnetic material; and
   a protective covering on said thin film structure, said covering comprising at least two protective layers of different inorganic nonmagnetic insulating material or mixture thereof, adjacent layers of said protective covering being of different composition, one of said protective layers covering said thin film structure and another of said protective layers covering said one protective layer.

2. An element according to claim 1, wherein each layer of said protective covering comprises a mixture of at least two major constituents.

3. An element according to claim 1, wherein said protective covering comprises a multilayered film.

4. An element according to claim 1, wherein the nonmagnetic insulating materials of said protective covering are two materials selected from the group consisting of $Al_2O_3$, $SiO_2$ and SiC.

5. An element according to claim 1, wherein said organic material is a photoresist material.

* * * * *